United States Patent [19]

Goers et al.

[11] Patent Number: 4,806,379
[45] Date of Patent: Feb. 21, 1989

[54] PROCESS FOR PRODUCING A GREEN LEAF ESSENCE

[75] Inventors: Steven K. Goers, Ossining; Parviz Ghossi, Tarrytown; John T. Patterson, North Tarrytown; Cynthia L. Young, Brewster, all of N.Y.

[73] Assignee: General Foods Corporation, White Plains, N.Y.

[21] Appl. No.: 58,427

[22] Filed: Jun. 5, 1987

[51] Int. Cl.$^4$ .............................................. A23L 1/221
[52] U.S. Cl. ..................... 426/650; 426/386; 426/425; 426/478; 426/489; 426/492
[58] Field of Search .............. 426/650, 655, 386, 387, 426/425, 426, 428, 429, 49, 478, 489, 492, 495

[56] References Cited

U.S. PATENT DOCUMENTS

| 1,978,171 | 2/1932 | Rolle | 426/655 |
|---|---|---|---|
| 2,904,440 | 9/1959 | Dimick et al. | 426/429 |
| 3,071,474 | 1/1963 | Gross | 426/429 |
| 4,335,002 | 6/1982 | Musslhan et al. | 426/534 |
| 4,597,978 | 7/1986 | Dimitriou | 426/492 |
| 4,666,561 | 5/1987 | Dufresne | 426/492 |

FOREIGN PATENT DOCUMENTS 0174821  3/1986  European Pat. Off. ............ 426/534

OTHER PUBLICATIONS

Sekiya et al., Biosynthesis of Leaf Alcohol Formation of 3Z-Hexenal from Linolenic Acid in Chloroplasts of Thea Sinensis Leaves, Agr. Biol. Chem., 40(1), 185-190, 1976.

Hatanaka, Biosynthesis of Leaf Alcohol, Bull. Inst. Chem. Res., Kyoto Univ., vol. 61, No. 2, 1983.

Sekiya et al., Seasonal Changes in Activities of Enzymes Responsible for the Formation of $C_6$-aldehydes and $C_6$-Alcohols in Tea Leaves, Plant and Cell Physiol. 25(a): 269-280 (1984).

Hatanka, A., "Biosynthesis of Leaf Alcohol", Bull. Inst. Chem. Res., Kyoto Univ., vol. 61, No. 2, 1983, pp. 180-192.

Sekiya et al., "Seasonal Changes in Activities of Enzymes . . . ", Plant and Cell Physiol. 25(2): 269-280 (1984).

Primary Examiner—Donald E. Czaja
Assistant Examiner—Helen Pratt
Attorney, Agent, or Firm—Thomas A. Marcoux; Thomas R. Savoie; Daniel J. Donovan

[57] ABSTRACT

A process for producing a natural flavorant, green leaf essence, containing leaf aldehyde, leaf alcohol and at least 10% cis-3-hexenal is disclosed. The process comprises homogenizing strawberry leaves with or without stems attached thereto in water to form a slurry. Prior to homogenization or concurrently therewith, from 1 to 10 mM of linolenic acid is added. The homogenate is then fed to a scraped or wiped surface evaporator and subsequently fractionated and concentrated to form a green leaf essence. The essence may be added to a food product to impart a fresh green fruity flavor and/or enhance the fresh flavor impact of the food product.

11 Claims, No Drawings

PROCESS FOR PRODUCING A GREEN LEAF ESSENCE

BACKGROUND OF THE INVENTION

1. Technical Field

The invention relates generally to the production of natural flavorants and their incorporation into food products to impart or augment a certain flavor. Specifically the process involves the production of a natural flavor essence derived from strawberry plant material which will impart to a food product, a fresh green fruity flavor and/or enhance the fresh flavor impact of the food product.

2. Background Art

The food art has recently strived to produce natural flavors to be incorporated into food products. Consumers have become wary of the presence of artificial ingredients thereby increasing the need for the production of natural flavorants. Cis-3-hexenol, also known as leaf alcohol, is an important ingredient in formulating a fresh strawberry flavor. Leaf alcohol and leaf aldehyde (also known as trans-2-hexenal) are known to be present in fresh leaves, vegetables and fruits. J. Sekiya, et al in an article entitled Biosynthesis of Leaf Alcohol Formation of 3Z-Hexenal from Linolenic Acid in Chloroplasts of Thea sinensis Leaves teaches the importance of cis-3-hexenal as the precursor of leaf alcohol. Linolenic acid in the presence of oxygen is metabolized to cis-3-hexenal which is easily isomerized to leaf aldehyde. In this particular work carried out on fresh tea leaves, the enzyme system responsible for the breakdown of linolenic acid was reported to be present within the plant chloroplasts. In a review article entitled Biosynthesis of Leaf Alcohol by A. Hatanaka the biosynthetic pathway leading to the production of leaf alcohol was discussed. Linolenic acid was added to a blend of summer tea leaves and trans-2-hexenal and cis-3-hexenol were produced. The author states that approximately ¼ to ⅓ of the linolenic acid was converted to trans-2-hexenal and cis-3-hexenol. In this particular experiment, cis-3-hexenal, which the author teaches to be a labile compound, was not detected allegedly because of isomerization to trans-2-hexenal. Additional experiments on the pathway of $C_6$-aldehydes led to the discovery that when linolenic acid was incubated with tea chloroplasts, cis-3-hexenal and trans-2-hexenal were produced and confirmed by chromatography. The enzyme activities were higher in the chloroplasts harvested during the summer and were lower for those harvested in the winter. Strawberry leaves were identified as possessing an enzyme system containing high degree of activity for producing $C_6$-aldehydes. Similarly J. Sekiya et al. in an article entitled Seasonal Changes In Activities Of Enzymes Responsible For The Formation Of $C_6$-aldehydes and $C_6$-alcohols in Tea Leaves, and the Effects of Environmental Temperatures on the Enzyme Activities discusses the formation of volatile $C_6$-compounds such as hexanal, cis-3-hexenal, cis-3-hexenol and trans-2-hexenal being derived from linolenic or linoleic acids when combined with a homogenate of tea leaves.

While the art describes the production of leaf alcohol and leaf aldehyde, there is a need to describe a process for producing and recovering a natural flavorant, green leaf essence, containing leaf aldehyde, leaf alcohol and cis-3-hexenal in a partially purified form for incorporation as a flavor essence into foodstufs.

DISCLOSURE OF THE INVENTION

The invention discloses a process for producing a natural flavorant containing leaf aldehyde, leaf alcohol and at least 10% cis-3-hexenal which comprises:
  (a) homogenizing strawberry leaves with or without stems attached thereto in water to form a slurry;
  (b) prior to step (a) or concurrently therewith adding from 1 to 10 mM of linolenic acid;
  (c) feeding the homogenate to a scraped or wiped surface evaporator under a vacuum of at least 20 inches Hg up to a maximum of 28.5 inches Hg and maintaining said homogenate within the evaporator for a residence time varying from 15 seconds to 3 minutes and condensing the evaporate to form a condensate; and
  (d) fractionating and concentrating the condensate to recover the natural flavorant.

The natural flavorant, also referred to as a green leaf essence, may be added to a food product at a level to impart a fresh green fruity flavor and/or enhance the fresh flavor impact of the food product. The term essence as hereinafter utilized refers to the flavorant in a diluent such as water, alcohol, etc. The flavorant must contain a combination of the leaf aldehyde, leaf alcohol and cis-3-hexenal in a proportion such that the aldehyde constituents make up greater than 90% of the three major constituents (leaf aldehyde, leaf alcohol and cis-3-hexenal) and the cis-3-hexenal must comprise at least 10% of the total flavorant in order for the flavorant to possess its unique flavor attributes.

BEST MODE TO CARRY OUT THE INVENTION

The strawberry plant material which may either be strawberry leaves or strawberry leaves with stems attached act as biochemical catalysts used to produce the green leaf essence. The strawberry plant material is preferably freshly cut or it may be frozen provided that the strawberry material is frozen below −30° C. Enhancement levels will drop considerably (approximately 30%) after approximately 2 days of frozen storage but will maintain enzymatic activity for at least 2 weeks when frozen to below −30° C. Fresh Douglas variety strawberry leaves and stems are the preferred strawberry source. When the strawberry material is harvested, care must be taken to prevent leaf and stem damage as this will disrupt the intracellular compartmentation resulting in poor bioconversion efficiencies and off-flavor development. The concentration of solids in the strawberry leaf-stem slurry generally will not exceed 10% total solids, preferably 3 to 5%, because too high a solids concentration will be difficult to evaporate without generating off flavors. The temperature of the water should preferably vary from 20° to 37° C., most preferably at or near ambient room temperature.

A source of linolenic acid is added prior to the homogenization of the strawberry material or concurrently therewith. From 1 to 10 mM of linolenic acid are added, preferably from 3 to 4 mM. The linolenic acid source may be a pure form of linolenic acid, 50% linolenic acid or hydrolyzed linseed oil (which contains approximately 50% linolenic acid) and combinations thereof. The linseed oil is the most economic source of linolenic acid and linseed oil is utilized hexanal and hexanol may also be generated due to the presence of a low level of linoleic acid (approximately 10 to 20%) in linseed oil adding to the complexity of the green leaf essence generated. These additional compounds may provide some positive apple and fruity character to the essence. In addition, canola oil (containing approximately 10% linolenic acid) may also be used as a source of linolenic acid. Conceivably any oil containing linolenic acid may be a suitable source as long as the oil does not contain too high a concentration of linoleic acid. Preferably the linolenic acid must be in the free fatty acid form.

When linseed oil is utilized as the linolenic acid source, it is preferably processed to generate hydrolyzed linseed oil. In one such process, edible linseed oil is mixed with ethanol, preferably 95% ethanol, at about a one to one ratio (weight:weight). Sodium hydroxide is added at a 3-fold molar excess of the linseed oil triglycerides and the mixture is brought to a boil and refluxed for 2 hours. The mixture is cooled and an equivalent molar amount of hydrochloric acid is added to drop the pH and precipitate the saturated fatty acids. As an example, 1 pound of linseed oil is added to approximately 1 pound of 95% ethanol and 0.14 pounds of sodium hydroxide. After refluxing, 0.39 pounds of concentrated hydrochloric acid is added. The resulting hydrolyzed linseed oil is decanted and is suitable for use in the process of producing green leaf essence.

After the strawberry material has been contacted with the linolenic acid, the homogenate should be processed rapidly, within a period of 24 hours, preferably within 8 hours, to prevent flavor degradation, i.e. loss of cis-3-hexenal and/or off-flavor development. Most preferably the homogenate will be fed directly to the scraped or wiped surface evaporator as part of a semi-continuous system with little or no homogenate holding time. The homogenate is processed, via evaporation/condensation and fractionation/concentration to produce a green leaf essence. The homogenate is fed to a scraped or wiped surface evaporator where it is processed under a vacuum of at least 20 inches Hg up to a maximum of 28.5 inches Hg for a residence time in the evaporator varying from 15 seconds to 3 minutes. The product temperatures corresponding to these vacuum conditions will be from 90° F. to 160° F. Preferably the vacuum is maintained at from 25 to 27 inches Hg which corresponds to a product (homogenate) temperature within the range of from 115° F. to 135° F. Preferably the residence time will be under 1 minute. The residence time, product temperature and vacuum conditions are maintained in a relationship such that during processing no off notes are generated. Longer evaporation times may result in increased recovery but the essence so generated will suffer from lower quality and off flavor production. After evaporation the vapor is condensed under conditions which are well known in the art.

The condensate which is formed should be further fractionated and concentrated. One such method to accomplish this is by subsequent distillation processing to form a leaf essence. Preferably, however, the condensate is passed over an adsorbent to isolate and concentrate the volatile materials. The adsorbent should be a macroreticular non-ionic hydrophobic resin with the polymers of styrene and divinyl benzene being the most preferred resins. The adsorbent should also be approved for food contact usage. The aqueous condensate containing the volatile flavorants may be passed over the resin column preferably at a loading rate of from 250 to 350 ml. per minute per liter bed volume of resin until such time as the resin is completely loaded as determined by the presence of chemicals coming off the column as detected by chromatographic or organoleptic means. The resin column is then eluted with a food approved solvent, preferably a food approved alcohol or by steaming the column. Preferably, elution is accomplished with ethyl alcohol or isopropyl alcohol at a concentration of from about 50% to about 95% alcohol and water. Preferably, the column is pressurized with air to 20 to 30 psig during alcohol elution to suppress the formation of air bubbles thus preventing channeling and thereby maximizing elution efficiency. During alcohol elution the column is preferably eluted at 60 to 70 ml. per minute per liter bed volume of resin. The desorbate (by solvent or steam) can be used directly or can be freeze dried, spray dried or drum dried via normal procedures on maltodextrin (e.g., Frodex) to produce a stable, dry, free flowing material which can be used alone or in combination with other flavors. Preferably the flavorant takes the form of an essence in combination with alcohol which is used to elute the volatile flavorant from the resin. Most preferably the flavorant is combined with ethanol at a concentration of from 0.1% to 1.0% volatiles.

The vast majority of the volatiles contained within the leaf essence, at least 80% of the essence, Preferably from 85 to 90% of the essence are comprised of the combination of cis-3-hexenal, trans-2-hexenal and cis-3-hexenol. Of the three major volatile constituents, the aldehydes predominate, i.e. the combination of the cis-3-hexenal and the trans-2-hexenal makes up greater than 90% of the total of the three major constitutents. In addition the essence must contain at least 10% cis-3-hexenal because it contributes to the freshness impact when the essence is incorporated into a food product. In a typical green leaf essence produced by the bioconverison of linseed oil, hexanal and hexanol are additonally produced below approximately 10% by weight of the essence. In all cases cis-3-hexenyl acetate and trans-2-hexenol are present in the green leaf essence at low levels.

The green leaf essence is typically added to a wide variety of food products including beverages, desserts, green vegetables, fruit-containing baked goods and cereals and beer, preferably fruit-flavored beverages (dry beverage mixes and ready-to-drink beverages) and desserts to impart a fresh green fruity flavor and/or enhance the fresh flavor impact of the product. The level of addition in food products will vary from 3 to 300 parts per billion (ppb), preferably from 10 to 50 ppb on an as-consumed basis the level corresponding to the amount of volatiles only.

EXAMPLE I

Green leaf essence was produced as follows:

28.25 lbs. strawberry leaves (Douglas variety) were homogenized in 5 separate batches. Batches 1-4 contained 6.5 lbs. leaves, 32.5 lbs. spring water, and 10g 99% linolenic acid. Batch 5 contained 2.25 lbs. leaves, 21 lbs. spring water (additional water was added to ensure mixing), and 10g 99% linolenic acid. Each batch was homogenized for 5 min. in a Daymax high-shear mixer. A total of 163.1 lbs. homogenate was collected. Total cis-3-hexenal, trans-2-hexenal, and cis-3-hexenol levels in the homogenate was analyzed and measured to contain 7262.4 mg. The homogenate was loaded into a Rodney Hunt Turba-Film thin film evaporator and the condensate collected. The Rodney Hunt evaporator is operated under the following conditions: vacuum at 27" Hg (product temperature of 115° F.), and throughput adjusted to achieve 1 min. residence time in the evaporator. Under these conditions 50% evaporation of water is achieved. The vapor containing volatiles is condensed and collected for concentration on t e XAD-4 column. The condensers were cooled with ice chilled water and sized so as to remove 99% of the vapor. Approximately 61.5 lbs. condensate was loaded onto a macroreticular non-ionic resin (commercially available polymer of styrene and vinyl benzene known as XAD-4 and manufactured by Rohm & Haas, Philadelphia, Pa.). The condensate is loaded onto a prewashed XAD-4 column (1"×12") at a flow rate of ca. 40-50 ml/min. Prior to loading, the XAD-4 resin was wetted with methanol and the fines decanted. After pouring the column, the bed was washed with 20 bed volumes of methanol and then back washed with at least 30 bed volumes of spring water. Prior to elution the column is pressurized with air to 20 to 30 psig. The volatiles are eluted with 70% ethanol/30% spring water at a flow rate of 15-20 ml/min. 1000 ml. of essence was collected totalling 3140.0 mg. volatiles. The green leaf essence contained 0.314% volatiles (leaf aldehyde, leaf alcohol and cis-3-hexenal) in 70% ethanol. The essence contained 0.88 mg/ml of cis-3-hexenal, 2.14 mg/ml of trans-2-hexenal and 0.12 mg/ml of cis-3-hexenol for a ratio of 7.3:17.8:1 of the volatiles respectively. This essence diluted in a sucrose/citric acid solution was sampled by a trained taste panel and was judged to be a high impact/quality, fruity/grassy green flavorant suitable for product use. The green leaf essence natural flavorant was analyzed for the presence of the three major volatiles. The results appear below:

| Volatile Constituent | Percentage of Total Volatiles* |
|---|---|
| Cis-3-Hexenal | 28.0% |
| Trans-2-Hexenal | 68.2% |
| Cis-3-Hexenol | 3.8% |

*Expressed as a Percentage of the total of the three major volatiles only. The essence also contained low levels of hexanal, hexanol, cis-3-hexenyl acetate and trans-2-hexenol.

EXAMPLE II

Approximately 30 lbs. of strawberry leaves (Douglas variety) were homogenized in six (6) separate batches. Each batch contained 5 lbs. leaves, 25 lbs. spring water and 35 ml hydrolyzed linseed oil (containing approximately 3 mM linolenic acid). The linseed oil was hydrolyzed by the process set forth on pages 4 and 5 of the instant specification. Each batch was homogenized for five minutes in a Daymax mixer. The homgenate from each batch was collected and combined. A total of 178.5 lbs. of homogenate was collected which contained a total of 7293.5 mg volatiles. The homogenate was loaded into the Rodney Hunt thin film evaporator and was processed via evaporation and condensation in a similar manner as outlined in Example I. The condensate was loaded onto an XAD-4 resin and eluted under pressure with 70% ethanol as described in Example I. A total of 1500 ml essence containing 0.17% of the three major volatiles in 70% ethanol was recovered. Approximately 2655 mg of total volatiles were recovered.

A sample of the green leaf essence produced in Example II (utilizing hydrolyzed linseed oil as the linolenic acid source) was analyzed and was found to contain the following volatiles expressed as a percentage:

| Volatile Constituent | Percentage of Total Volatiles |
|---|---|
| Hexanal | 4.9 |
| Cis-3-Hexenal | 32.8 |
| Trans-2-Hexenal | 49.1 |
| Hexanol | 2.2 |
| Cis-3-Hexenyl Acetate | 1.3 |
| Cis-3-Hexenol | 6.3 |
| Trans-2-Hexenol | 0.3 |
| Unknowns | 3.1 |

As is apparent, the green leaf essence is made up of 88.2% of three (3) major volatiles (cis-3-hexenol, trans-2-hexenal and cis-3-hexenal). Of the volatiles present, 96.9% were positively identified.

The flavorant produced in Example II was incorporated into a naturally-flavored strawberry and raspberry beverage at a level of 4 ppb. of the three major volatiles. A trained taste panel evaluated the samples verses controls and concluded that the samples containing the natural flavorant of the present invention were superior quality beverages possessing a greater fresh flavor impact.

The flavorant produced in Example II was also incorporated into a naturally-flavored strawberry frozen fruit bar at a level of 20 ppb of the three major volatiles. The fruit bar was evaluated by a trained taste panel and was judged to possess a greater fresh flavor impact as compared to a control.

We claim:

1. A process for producing a natural flavorant containing leaf aldehyde, leaf alcohol and at least 10% cis-3-hexenal which comprises:
    (a) homogenizing strawberry leaves with or without stems attached thereto in water to form a slurry containing a strawberry leaf/stem solids concentration not exceeding 10%;
    (b) prior to step (a) or concurrently therewith adding from 1 to 10 mM of linolenic acid in the free fatty acid form;
    (c) feeding the homogenate containing said strawberry leaf/stem solids within a period of 24 hours after addition of linolenic acid and homogenization to a scraped or wiped surface evaporator under a vacuum of at least 20 inches Hg up to a maximum of 28.5 inches Hg, said vacuum corresponding to a homogenate temperature of from 90° F. to 160° F. and maintaining said homogenate within the evaporator for a residence time varying from 15 seconds to 3 minutes and condensing the evaporate to form a condensate; and
    (d) passing the condensate over an adsorbent and eluting to recover the natural flavorant.

2. The process of claim 1 wherein the linolenic acid is selected from the group consisting of pure linolenic acid, 50% linolenic acid, hydrolyzed linseed oil, canola oil and combinations thereof.

3. The process of claim 2 wherein the linolenic acid is derived from hydrolyzed linseed oil.

4. The process of claim 1 wherein the linolenic acid is added at a level of from 3 to 4 mM.

5. The process of claim 1 wherein the concentration of solids is from 3 to 5%.

6. The process of claim 1 wherein the homogenate is processed within 8 hours.

7. The process of claim 1 wherein the vacuum is maintained at from 25 to 27 inches Hg and the homogenate temperature ranges from 115° F. to 135° F.

8. The process of claim 1 wherein the fractionating and concentrating of step (d) is accomplished by distillation.

9. The process of claim 1 wherein the adsorbent is a macroreticular non-ionic hydrophobic resin.

10. The process of claim 9, wherein the adsorbent containing volatiles is eluted with a food approved solvent or with steam.

11. The process of claim 10 wherein the adsorbent is eluted under pressure from 20 to 30 psig with a food approved solvent which is ethyl alcohol or isopropyl alcohol at a concentration of from about 50% to 95% alcohol and water.

* * * * *